(No Model.)
E. HESTER.
DIPPER.
No. 323,332. Patented July 28, 1885.
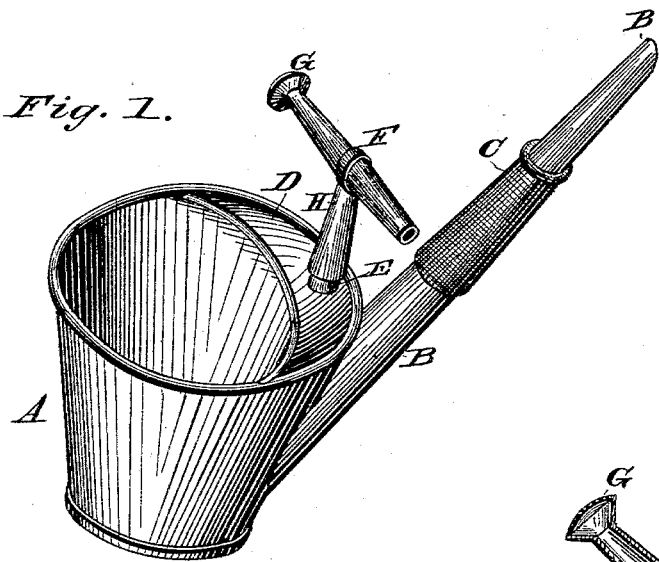
Fig. 1.
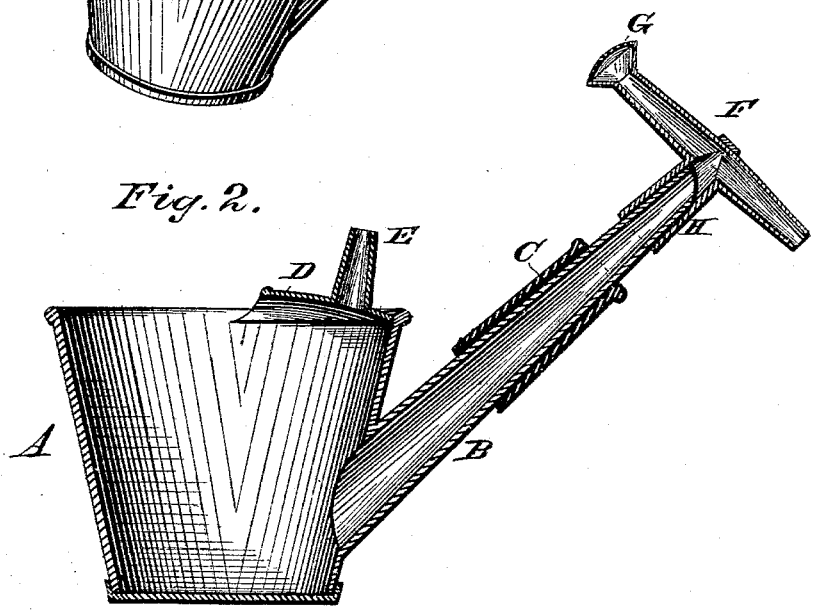
Fig. 2.
Fig. 3.
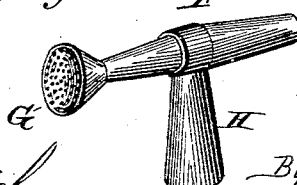
WITNESSES
Phil C. Dietrich.
Wm. Bagger.
Ebenezer Hester
INVENTOR,
By Louis Bagger & Co.
Attorney

UNITED STATES PATENT OFFICE.

EBENEZER HESTER, OF UNIONVILLE, CONNECTICUT.

DIPPER.

SPECIFICATION forming part of Letters Patent No. 323,332, dated July 28, 1885.

Application filed April 14, 1885. (No model.)

*To all whom it may concern:*

Be it known that I, EBENEZER HESTER, a citizen of the United States, and a resident of Unionville, in the county of Hartford and State of Connecticut, have invented certain new and useful Improvements in Dippers; and I do hereby declare that the following is a full, clear, and exact description of the invention which will enable others skilled in the art to which it appertains to make and use the same, reference being had to the accompanying drawings, which form a part of this specification, and in which—

Figure 1 is a perspective view. Fig. 2 is a longitudinal vertical sectional view, and Fig. 3 is a detail view of the nozzle.

Similar letters of reference indicate corresponding parts in all the figures.

My invention relates to dippers; and it consists in the improved construction and combination of parts of the same which facilitate its use for several household purposes, as will be hereinafter more fully described and claimed.

In the drawings, A indicates the cup, which is provided with a tubular tapering handle, B, having a band, C, surrounding it, said band being made of a material which is a non-conductor of heat. The cup is partly covered by a shield, D, which has a stud or projection, E. The nozzle F is T-shaped, one of its arms being provided with a sprinkler, as shown at G, Fig. 3. The central arm, H, is made of a size to fit over the end of the hollow handle B when in use, and also fits upon the projection E, upon which it is placed when not in use. The nozzle may be placed upon the end of the handle with either the sprinkler or the round spout downward ready for use, as desired.

This device is a useful implement in the kitchen and household, as it may be used with the round spout of the nozzle in filling bottles, thus dispensing with the use of a funnel, and can also be used for filling a tea-kettle through its mouth without removing the lid. It may be used in sprinkling starched clothes preparatory to ironing them, and for sprinkling house-plants. The cup may have measuring-marks on its inner side, so that the desired quantity of water or other liquid may be used. The band C protects the hands of the person using it when the dipper is used in hot water.

Having thus described my invention, I claim and desire to secure by Letters Patent of the United States—

1. A dipper having a tubular handle provided with a hand or handle grip of non-conducting material and forming a nozzle at its outer end, substantially as and for the purpose shown and set forth.

2. The combination of the dipper having a tubular handle and shield as described, said shield having an upward projection, and the removable and adjustable T-shaped nozzle having a rose or sprinkler on one of its arms and adapted to be fitted upon the shield-stud when not in use, substantially as and for the purpose shown and set forth.

In testimony that I claim the foregoing as my own I hereunto affix my signature in presence of two witnesses.

EBENEZER HESTER.

Witnesses:
 J. C. WAPERBACH,
 JAMES MULHALL.